United States Patent
Tinet et al.

[15] 3,636,768
[45] Jan. 25, 1972

[54] INFRARED HYGROMETERS

[72] Inventors: Claude Tinet; Pierre Misme, both of Paris, France

[73] Assignee: Thomson-CSF

[22] Filed: June 18, 1970

[21] Appl. No.: 47,450

[30] Foreign Application Priority Data

June 30, 1969 France .................................. 6921968

[52] U.S. Cl. .................................. 73/336.5, 73/29, 250/218
[51] Int. Cl. .................................. G01n 21/34
[58] Field of Search .................................. 73/336.5, 29; 250/218

[56] References Cited

UNITED STATES PATENTS

| | | | |
|---|---|---|---|
| 2,621,297 | 12/1952 | Obermaier | 73/29 |
| 2,761,067 | 8/1956 | Troy | 250/218 |
| 3,071,037 | 1/1963 | Brumley | 250/218 |

FOREIGN PATENTS OR APPLICATIONS 648,929  9/1962  Canada .................................. 73/29

*Primary Examiner*—Louis R. Prince
*Assistant Examiner*—Denis E. Corr
*Attorney*—Kurt Kelman

[57] ABSTRACT

An infrared hygrometer comprising an infrared source supplying two identical infrared beams chopped alternately. One of the beams passes through an enclosure containing dry air at the atmospheric pressure and the other beam passes through a second enclosure in which the air whose humidity is to be measured circulates. Two auxiliary cavities in which this air also circulates are located in the path respectively of the two beams and have windows for the passage of these beams. The cavity which is disposed in the path of the beam passing through the second enclosure communicates with this enclosure by an opening through which this beam passes, so that the number of faces of windows in contact with the humid air is identical in the paths of the two beams. An infrared detector receives the two beams and its output signal is applied to measuring circuits with synchronous detection.

4 Claims, 2 Drawing Figures

INVENTORS
CLAUDE TINET
PIERRE MISME

BY *Kurt Kelman*

AGENT

INFRARED HYGROMETERS

The present invention relates to infrared hygrometers.

It is well known, where measurement of atmospheric humidity is concerned, to compare the attenuation produced in two infrared beams coming from one and the same source and passing respectively through a dry atmosphere as a reference and through the humid atmosphere whose humidity is to be measured. In order to obtain accurate and correct measurement, it is essential to use reference and measurement channels which form as closely as possible identical infrared radiation propagation paths and whose residual differences result in attenuations which are constant with time, in order thus to eliminate these causes of error by calibration of the apparatus. However, the humid air, whose humidity is to be measured, circulates through the measurement channel within a volume which is generally limited by windows which are transparent to infrared radiation. The water vapor with which it is charged can partially condense on these windows thus modifying their transmissivity and falsifying the measurement, this falsification affecting only the measurement channel and varying, furthermore, as a function of the humidity of air. This source of error is still more serious in cases where measurements are being carried out on sea air, in which case salt deposits can obscure the windows and produce a random modification in transparency.

It is an object of this invention to overcome this drawback.

According to the invention, there is provided in infrared hygrometer, for measuring the humidity of a given air, comprising: an infrared source; first means associated with said source for supplying first and second identical infrared beams and for chopping said beams alternately; a first enclosure containing dry air and located in the path of said first beam, said enclosure having an entrance and an exit window for said first beam; a second enclosure, in which said given air circulates, and which is located in the path of said second beam, said second enclosure having at least one window for the passage of said second beam; first and second cavities located respectively in the path of said first and second beams and in which said given air circulates, said first and second cavities being so selected that the lengths of the paths of said first and second beams respectively in said first and second cavities are identical, each of said cavities comprising at least one window for the passage of the beam in the path of which said last-mentioned window is located, all of said windows being identical, and the numbers of windows in contact with said given air in said cavities and in said second enclosure being so selected that the number of faces of windows in contact with said given air respectively in the path of said first beam and in the path of said second beam are identical; detector means for detecting said first and second beams after their passage through said enclosures and said cavities; and measuring circuits connected to said detector means and to said first means for measuring said humidity.

For a better understanding of the invention and to show how the same may be carried into effect, reference will be made to the drawings accompanying the ensuing description and in which.

Figure 1:
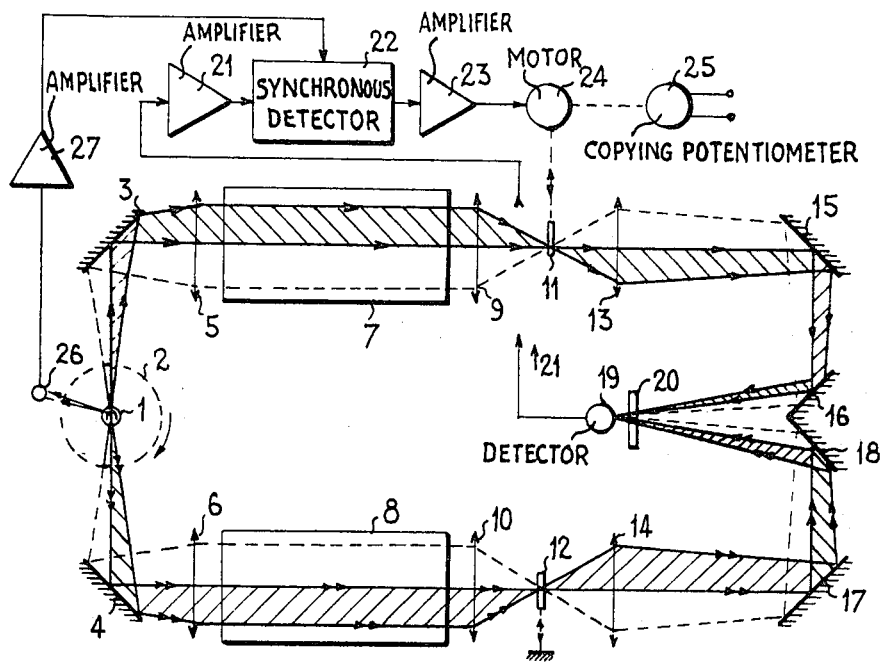
FIG. 1 is the basic diagram of an infrared hygrometer.

In FIG. 1, there is shown the basic diagram of a two-channel infrared hygrometer for differential and comparative measurement by the zero method. The zero method makes it possible to achieve a particularly accurate result.

An infrared source 1 produces two identical beams. The source is located within a hollow cylinder 2 in the wall of which are formed identical, uniformly spaced holes. The holes are so positioned that, when the cylinder rotates, the beams are alternately intercepted by the cylinder. The cylinder rotates at a uniform velocity. One of the beams, the reference beam, is reflected by a mirror 3 and then collimated by a lens 5 before passing through an enclosure 7 filled with dry air at atmospheric pressure. A lens 9 forms the image of the source 1 and, in the plane of this image, an attenuator 11 (for example a comb-type attenuator) is disposed, the position of which is controlled by a motor 24 and which introduces an attenuation variable according to its position. A lens 13 then, subsequently, reconstitutes the image of the source on a photodetector 19 through the medium of mirrors 15 and 16.

Similarly, the measurement beam is reflected by the mirror 4, then collimated by a lens 6 before passing through an enclosure 8, identical to enclosure 7, in which humid air, for example sea air is circulating, whose humidity is to be measured. A lens 10 forms the image of the source 1 and, in the plane of this image, there is located a variable attenuator 12 for setting the equipment to zero. A lens 14 then reforms the image of the source on the photodetector 19 through the medium of mirrors 17 and 18. An interference filter 20 is placed in the path of the two beams in order to select a spectrum band, the position and width of which are chosen to give maximum absorption by water vapor and minimum absorption by the other constituents of air (in particular carbon dioxide).

The differential alternating signal produced by the detector 19 is applied in a conventional way, through an amplifier 21, to a synchronous detector 22 which is also provided with a reference signal coming from the photodiode 26 and amplified by the amplifier 27. The synchronous detector 22 supplies a signal which depends, in amplitude and sign, on the difference between the luminous fluxes in the two channels. This signal, after amplification by the amplifier 23, controls a motor 24 which, at all times, controls the attenuator 11 in order to cancel out this difference in luminous flux. A copying potentiometer 25 then produces a signal which, after calibration of the apparatus, provides a measure of the attenuation suffered by the measurement beam as a consequence of the air humidity, and which can thus be translated directly into terms of a measurement of this humidity.

Figure 2:
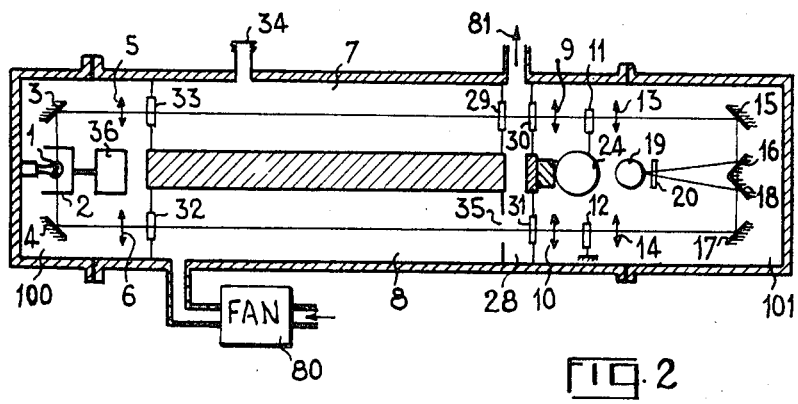
FIG. 2 illustrates, in schematic section, a part of an infrared hygrometer in which the improvement in accordance with the invention has been incorporated.

FIG. 2 schematically illustrates in section an embodiment, in accordance with the invention, of the optical section of such an infrared hygrometer.

The emissive section is located in a compartment 100 containing the source 1, the modulating cylinder 2, the mirrors 3 and 4 and the lenses 5 and 6. A motor 36 drives the cylinder 2 at a constant speed.

The optical part of the receiver section is located in a compartment 101 containing the lenses 9, 10, 13 and 14, the attenuators 11 and 12, the mirrors 15, 16, 17 and 18, the detector 19, the filter 20 and the motor 24 which controls the attenuator 11.

The enclosure 7 located in the path of the reference beam is bounded by windows 33 and 29 which are transparent to infrared radiation, this at least in the band determined by the filter 20. A sealed bellows system 34 enables the dry air in the enclosure 7 to be maintained at atmospheric pressure.

In the enclosure 8, which is identical to the enclosure 7 and bounded by a window 32 and an opening 35, sea air enters at atmospheric pressure, this for example through the medium of a fan 80 which keeps the air in circulation and eliminates droplets which could produce fogging. It will be seen that if the enclosure 8 were bounded by two windows, namely the one 32 and another one situated in the place of the opening 35, these two windows would be contaminated on one of their faces, in each case, by the sea air, where this would not be the case with the windows 33 and 29. The result would be a variable degree of unbalance between the two channels which would falsify measurements.

In accordance with the invention, in the two channels, two identical additional cavities are arranged in which the same sea air circulates as through the enclosure 8.

For convenience sake, these two cavities form a single cavity 28 in the apparatus shown in the drawing.

Moreover, the supplementary cavity in the measurement channel communicates directly with the enclosure 8, dispensing with the need for any window in the opening 35 in the measurement channel, and is closed off from the compartment 101 by a window 31. Similarly, the supplementary cavity in the reference channel is closed off from the compartment 101 by a window 30. Sea air which circulates through the enclosure 8 and the cavity 28, exits through the opening 81.

Under these conditions, the windows 32 and 31 in the measurement channel, and those 29 and 30 in the reference channel, are subjected to the same contaminating influences of the sea air and thus, at all times, there is compensation of the attenuations produced by these effects in the two channels.

Supplementary attenuation is introduced in the reference channel, by the window 33. However, the level of this attenuation is constant and its effect upon measurements is thus eliminated once the apparatus has been calibrated and set to zero by the attenuator 12. As far as the effects of the air contained in the compartments 100 and 101, are concerned, they are of course strictly the same for both the reference and the measurement channel.

Of course, the embodiment described is in no way limitative of the scope of the invention and the improvement in accordance with the invention can be used quite generally whatever the comparative measurement principle employed, this even if the optical paths employed in the volumes 7 and 8 are multiple.

What is claimed, is:

1. An infrared hygrometer, for measuring the humidity of a given air, comprising: an infrared source; first means associated with said source for supplying first and second identical infrared beams and for chopping said beams alternately; a first enclosure containing dry air and located in the path of said first beam, said enclosure having an entrance and an exit window for said first beam; a second enclosure, in which said given air circulates and which is located in the path of said second beam, said second enclosure having at least one window for the passage of said second beam; first and second cavities located respectively in the path of said first and second beams and in which said given air circulates, said first and second cavities being so selected that the lengths of the paths of said first and second beams respectively in said first and second cavities are identical, each of said cavities comprising at least one window for the passage of the beam in the path of which said last-mentioned window is located, all of said windows being identical, and the numbers of windows in contact with said given air in said cavities and in said second enclosure being so selected that the number of faces of windows in contact with said given air respectively in the path of said first beam and in the path of said second beam are identical; detector means for detecting said first and second beams after their passage through said enclosures and said cavities; and measuring circuits connected to said detector means and to said first means for measuring said humidity.

2. A hygrometer as claimed in claim 1, wherein said first cavity comprises an entrance window and an exit window for said first beam, said second enclosure and said second cavity comprise each one window for the passage of said second beam and an opening for direct communication of said second cavity with said second enclosure and for the passage of said second beam and of said given air.

3. A hygrometer as claimed in claim 1, wherein said first and second cavities are parts of a single cavity.

4. A hygrometer as claimed in claim 2, wherein said first and second cavities are parts of a single cavity.

* * * * *